United States Patent
Narita

(10) Patent No.: US 9,621,807 B2
(45) Date of Patent: *Apr. 11, 2017

(54) OPTICAL DEVICE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Yu Narita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,849

(22) Filed: Aug. 19, 2015

(65) Prior Publication Data

US 2015/0358548 A1 Dec. 10, 2015

Related U.S. Application Data

(62) Division of application No. 14/283,975, filed on May 21, 2014, now Pat. No. 9,247,138.

(30) Foreign Application Priority Data

May 28, 2013 (JP) .................................. 2013-111953
Mar. 19, 2014 (JP) .................................. 2014-056232

(51) Int. Cl.
*H04N 5/232* (2006.01)

(52) U.S. Cl.
CPC ..... *H04N 5/23264* (2013.01); *H04N 5/23287* (2013.01)

(58) Field of Classification Search
CPC ........ H04N 5/23248; G03B 2205/0007; G03B 2207/005; G03B 2217/005; G02B 27/646;
(Continued)

(56) References Cited

U.S. PATENT DOCUMENTS 6,122,449 A 9/2000 Satoh et al.
6,130,993 A 10/2000 Hayakawa
(Continued)

FOREIGN PATENT DOCUMENTS

CN 1937719 A 3/2007
CN 101107842 A 1/2008
(Continued)

OTHER PUBLICATIONS

Search Report issued on Nov. 26, 2014, that issued in the corresponding U.K. Patent Application No. GB1409431.2.
(Continued)

*Primary Examiner* — Mekonnen Dagnew
(74) *Attorney, Agent, or Firm* — Cowan, Liebowitz & Latman, P.C.

(57) ABSTRACT

An optical device that is capable of reducing eccentric aberration while reducing image blur. A first shake correction unit corrects image blur optically based on a shake amount that is detected by a shake detection unit. A second shake correction unit corrects image blur optically based on a shake amount that is detected by the shake detection unit. The second shake correction unit has a different image blur correction effect from the first shake correction unit. The optical device has a mode in which shake correction is performed using the first shake correction unit without using the second shake correction unit.

12 Claims, 6 Drawing Sheets

(58) Field of Classification Search
CPC . G02B 396/13; G02B 396/52; G02B 359/554
See application file for complete search history.

(56) References Cited

U.S. PATENT DOCUMENTS

| | | | |
|---|---|---|---|
| 8,497,918 | B2 | 7/2013 | Miyasako |
| 2007/0065130 | A1 | 3/2007 | Fukumoto et al. |
| 2008/0129831 | A1 | 6/2008 | Cho et al. |
| 2009/0021589 | A1* | 1/2009 | Okada .................... G03B 5/00 348/208.1 |
| 2009/0160952 | A1* | 6/2009 | Nakakuki .......... H04N 5/23248 348/208.4 |

FOREIGN PATENT DOCUMENTS

| | | |
|---|---|---|
| CN | 101201462 A | 6/2008 |
| CN | 102316268 A | 1/2012 |
| EP | 1931135 | 11/2008 |
| JP | 2001-249276 A | 9/2001 |
| JP | 2010-204341 A | 9/2010 |

OTHER PUBLICATIONS

The above foreign patent documents were cited in a Jan. 3, 2017 Chinese Office Action, a copy of which is enclosed with an English Translation, that issued in Chinese Patent Application No. 201410228059.6.
The above foreign patent documents were cited in a Jan. 3, 2017 Chinese Office Action, a copy of which is inclosed with an English Translation, that issued in Chinese Patent Application No. 201410228059.6.

* cited by examiner

STABILIZATION EFFECT PRIORITY MODE

IMAGE QUALITY PRIORITY MODE

MIDDLE MODE

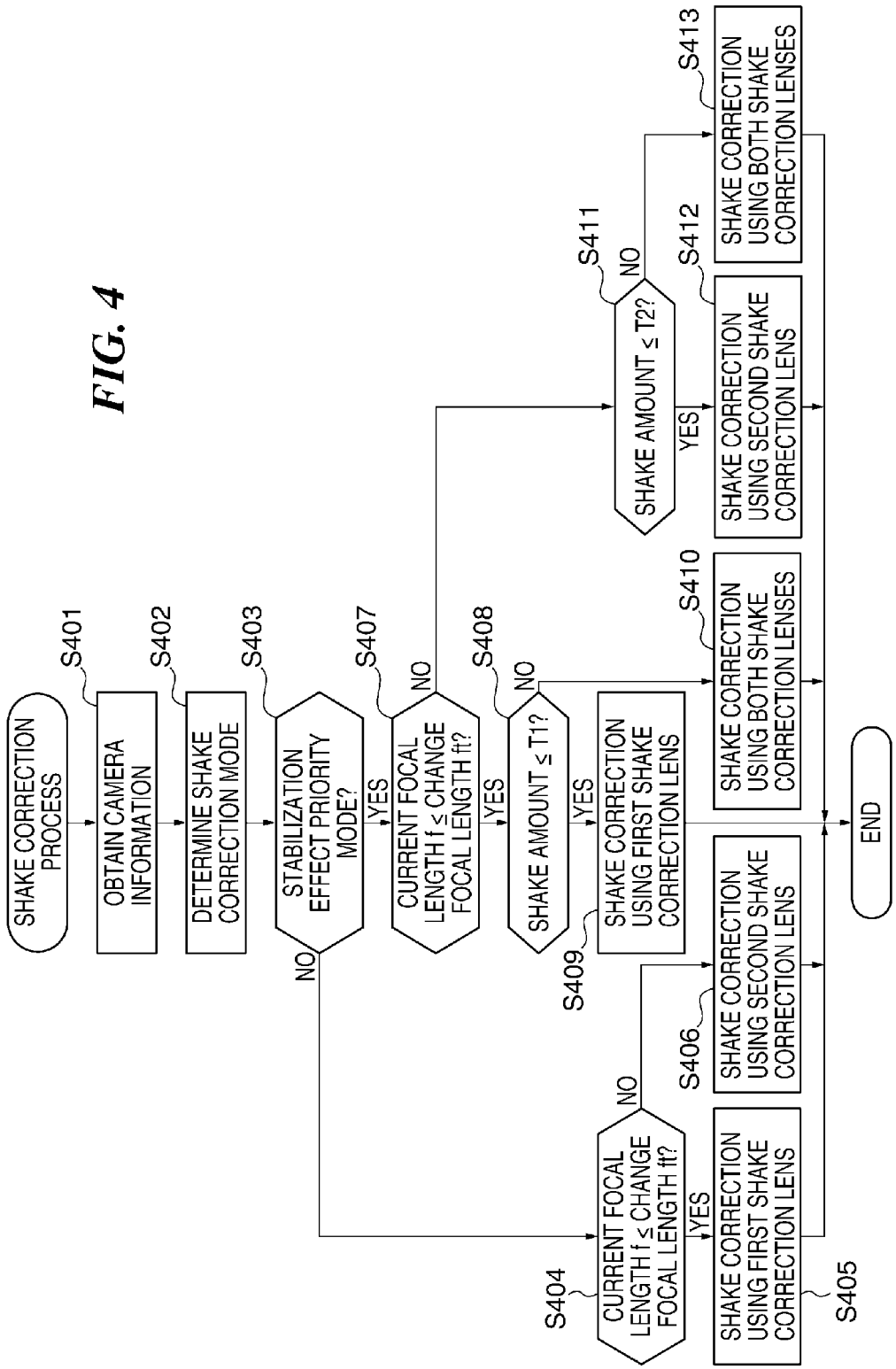

FIG. 6

| CAMERA INFORMATION / SHAKE CORRECTION MODE | | STABILIZATION EFFECT PRIORITY | IMAGE QUALITY PRIORITY |
|---|---|---|---|
| SHOOTING METHOD | | WALKING SHOOTING | ONE-HANDED SHOOTING |
| PERSON LIKENESS | | LOW | HIGH |
| MAIN SUBJECT INFORMATION | DISTANCE | FAR | NEAR |
| | SIZE | SMALL | LARGE |
| | MOTION | LARGE | SMALL |
| SHUTTER SPEED | | SLOW | FAST |
| SHOOTING MODE | | LANDSCAPE | PORTRAIT |

OPTICAL DEVICE, CONTROL METHOD THEREFOR, AND STORAGE MEDIUM STORING CONTROL PROGRAM THEREFOR

CROSS-REFERENCE TO RELATED APPLICATIONS

This application is a divisional of application Ser. No. 14/283,975, filed May 21, 2014 the entire disclosure of which is hereby incorporated by reference.

BACKGROUND OF THE INVENTION

Field of the Invention

The present invention relates to an optical device, a control method therefor, and a storage medium storing a control program therefor. Particularly, the present invention relates to a shake correction process technology of preventing image blur caused by camera shake etc. by using a plurality of shake correction lenses.

Description of the Related Art

Generally, in an image pickup apparatus, such as a digital video camera or a digital still camera, image blur may be caused by a user's camera shake etc. In order to prevent such image blur, there is a known image pickup apparatus that reduces image blur by driving a plurality of lenses, which are included in a photographing lens unit for forming an image of a subject, in response to a shake amount of the image pickup apparatus caused by camera shake (see Japanese Laid-Open Patent Publication (Kokai) No. 2001-249276 (JP 2001-249276A)). The image pickup apparatus of this publication moves the lenses in directions different from an optical axis direction in order to reduce image blur.

Incidentally, when a lens is moved in a direction different from an optical axis direction, an image distorts and a resolution deteriorates due to eccentric aberration as the shifting amount of the lens from the optical axis increases.

Optical properties of eccentricity aberration are complicated. Particularly, when two or more lenses are moved simultaneously, the optical properties become more complicated, which increases difficulty of the correction. Accordingly, a shake correction system that reduces image blur with two or more movable lenses is desirable to be controlled so as not to move two or more lenses simultaneously from a point of view of correcting eccentric aberration.

However, even if the system is controlled so as not to move two or more lenses simultaneously in order to reduce eccentricity aberration, since an image blur correction effect and an image quality deterioration effect of one lens are different from that of another lens, it is difficult to determine how to move each lens.

Accordingly, a conventional optical device and a conventional image pickup apparatus are difficult to reduce eccentric aberration while reducing image blur.

SUMMARY OF THE INVENTION

The present invention provide an optical device, a control method therefor, and a storage medium storing a control program therefor, which are capable of reducing eccentric aberration while reducing image blur.

Accordingly, a first aspect of the present invention provides an optical device comprising a shake detection unit, a first shake correction unit configured to correct image blur optically based on a shake amount that is detected by the shake detection unit, and a second shake correction unit configured to correct image blur optically based on a shake amount that is detected by the shake detection unit, and configured to have a different image blur correction effect from the first shake correction unit, wherein the optical device has a mode in which shake correction is performed using the first shake correction unit without using the second shake correction unit.

Accordingly, a second aspect of the present invention provides a control method for an optical device comprising a step of detecting camera shake, a step of correcting image blur optically by controlling a first shake correction unit based on shake amount detected in the shake detecting step, and a step of correcting image blur optically by controlling a second shake correction unit of which an image blur correction effect is different from that of the first shake correction unit based on shake amount detected in the shake detecting step, wherein the control method has a mode in which shake correction is performed using the first shake correction unit without using the second shake correction unit.

Accordingly, a third aspect of the present invention provides a non-transitory computer-readable storage medium storing a control program causing a computer to execute the control method for the optical device according to the second aspect.

According to the present invention, since the optical device obtains the shake detection result by detecting shake applied to the optical device, selects one of the image blur correction effect priority mode and the image quality priority mode based on the shake detection result concerned, and controls to move the shake correction lenses selectively according to the optical characteristics, i.e., since the optical device controls to move the shake correction lenses selectively in consideration of the image blur correction effects and the image quality deteriorations of the shake correction lenses, the eccentric aberration can be reduced according to a shooting condition, and the image blur can be reduced.

Further features of the present invention will become apparent from the following description of exemplary embodiments with reference to the attached drawings.

BRIEF DESCRIPTION OF THE DRAWINGS

FIG. 4 is a flowchart showing a shake correction process executed by the camera shown in FIG. 1.

FIG. 6 is a view showing examples of relationships between shake correction modes and camera information in the camera shown in FIG. 1.

DESCRIPTION OF THE EMBODIMENTS

Hereafter, embodiments according to the present invention will be described in detail with reference to the drawings.

Figure 1:
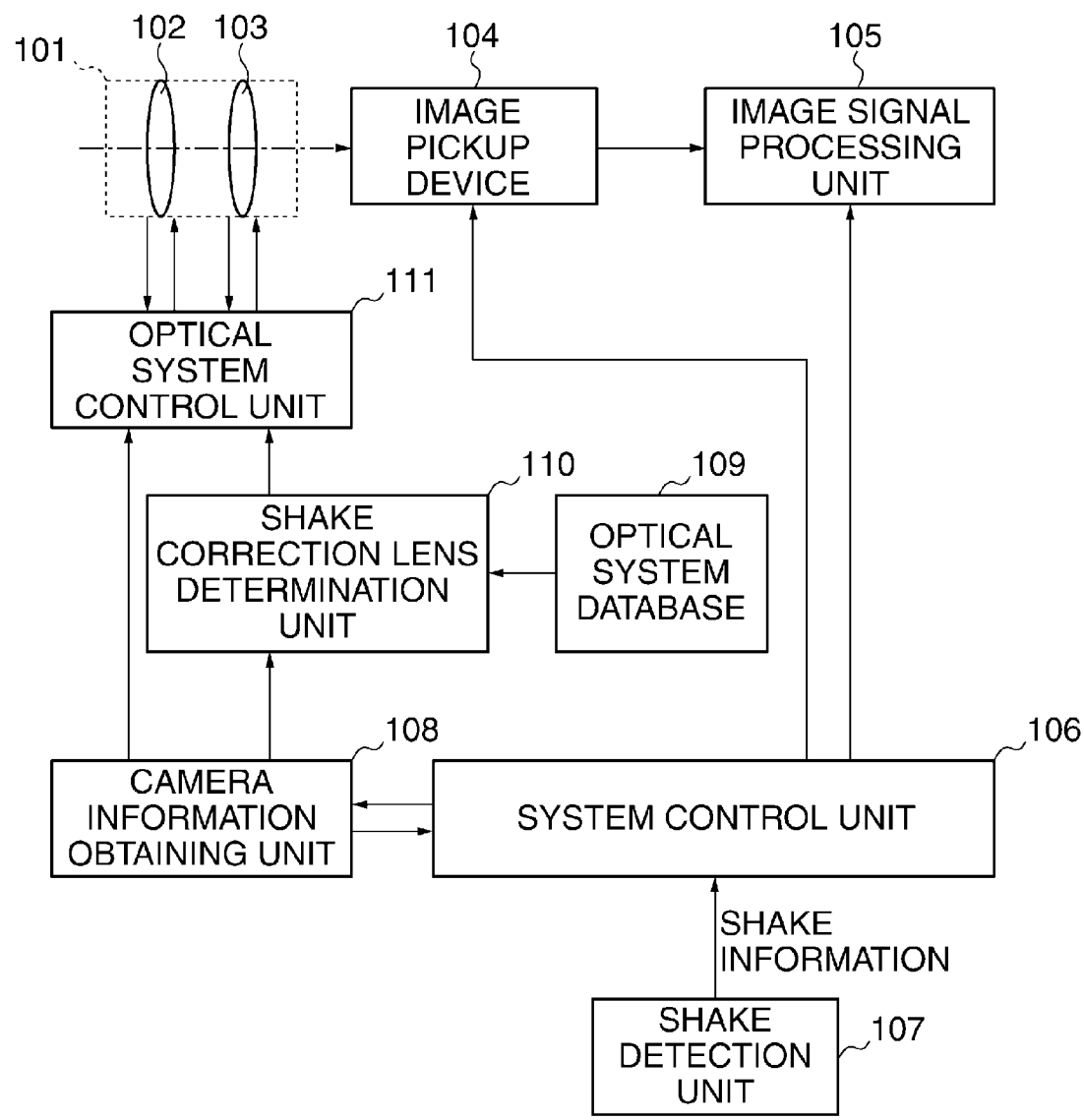
FIG. 1 is a block diagram schematically showing a configuration of an image pickup apparatus (a camera) as an optical device according to an embodiment of the present invention.

FIG. 1 is a block diagram schematically showing a configuration of an image pickup apparatus as an optical device according to an embodiment of the present invention.

The illustrated image pickup apparatus is a digital still camera (referred to as a camera, hereafter), and has an optical system 101 like a photographing lens unit. Then, the optical system 101 is provided with a first shake correction lens 102 and a second shake correction lens 103. An optical image is formed onto an image pickup device 104 through the optical system 101, and the image pickup device 104 outputs an analog signal (an image signal) corresponding to the optical image.

The image signal is inputted into an image signal processing unit 105, and the image signal processing unit 105 performs A/D conversion of the image signal to generate a digital signal (image data), and applies image processes, such as white balance adjustment, color (brightness and color-difference signal) conversion, and gamma correction, to the image data concerned. A system control unit 106 controls the whole camera 100.

For example, the system control unit 106 controls the focal length and the aperture value of the optical system 101, and controls driving of the image pickup device 104.

A shake detection unit 107 detects a motion (shake) of the camera, and sends shake information (a shake detection result) to the system control unit 106. The shake detection unit 107 is an angular velocity sensor, for example, detects the angular velocities of the motion of the camera around three axes (yaw, roll, and pitch), and outputs the angular velocities concerned to the system control unit 106 as the shake information.

A camera information obtaining unit 108 obtains the camera information required to presume the photographing condition of the camera including the above-mentioned shake detection result from the system control unit 106. The camera information includes a focal length, shake information, main subject information about a main subject, shutter speed, a shooting mode, etc., for example (here, the information other than the shake information is called shooting information). The system control unit 106 generates the shooting information according to analysis of an image obtained as a result of shooting and according to additional information added to the image.

An optical system database 109 stores characteristics that show relations between correction angles of the first shake correction lens 102 and the second shake correction lens 103 and qualities of images that are obtained as results of shootings as characteristics information. It should be noted that the characteristics information will be described later.

A shake correction lens determination unit 110 determines which of the first shake correction lens 102 and the second shake correction lens 103 should be used for the shake correction based on the camera information (particularly the shake information) sent from the camera information obtaining unit 108 and the characteristics information obtained from the optical system database 109.

An optical system control unit 111 controls driving of the shake correction lens determined by the shake correction lens determination unit 110 based on the shake information obtained from the camera information obtaining unit 108 and position information about the shake correction lenses obtained from the first shake correction lens 102 and the second shake correction lens 103.

In this case, the optical system control unit 111 controls driving of the shake correction lens determined by the shake correction lens determination unit 110 so as to cancel deviation between a light beam from a subject and the optical axis of the optical system caused by the shake. On the other hand, the shake correction lens that is not used for the shake correction is positioned in an initial state because the driving amount is zero.

Figure 2A:
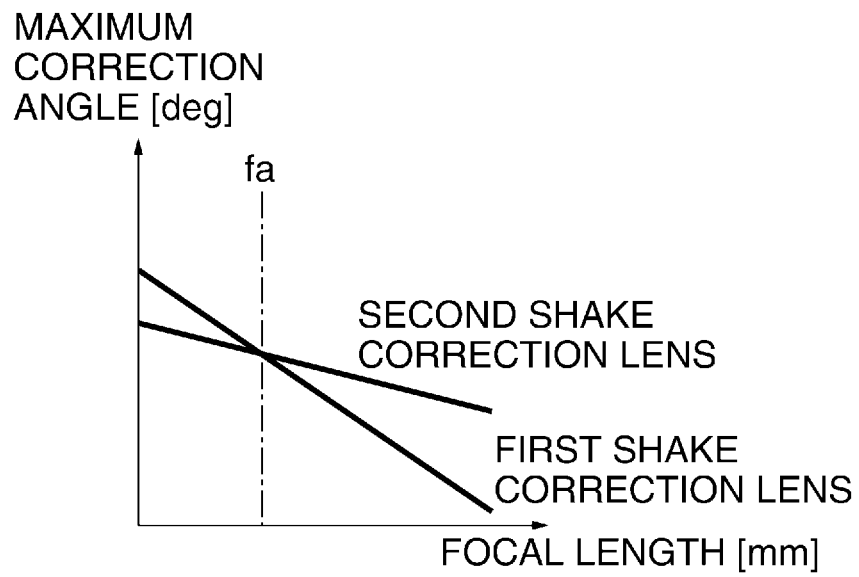
FIG. 2A is a graph showing relations between focal lengths and maximum correction angles of a first shake correction lens and a second shake correction lens among characteristics information stored in an optical system database shown in FIG. 1.
Figure 2B:
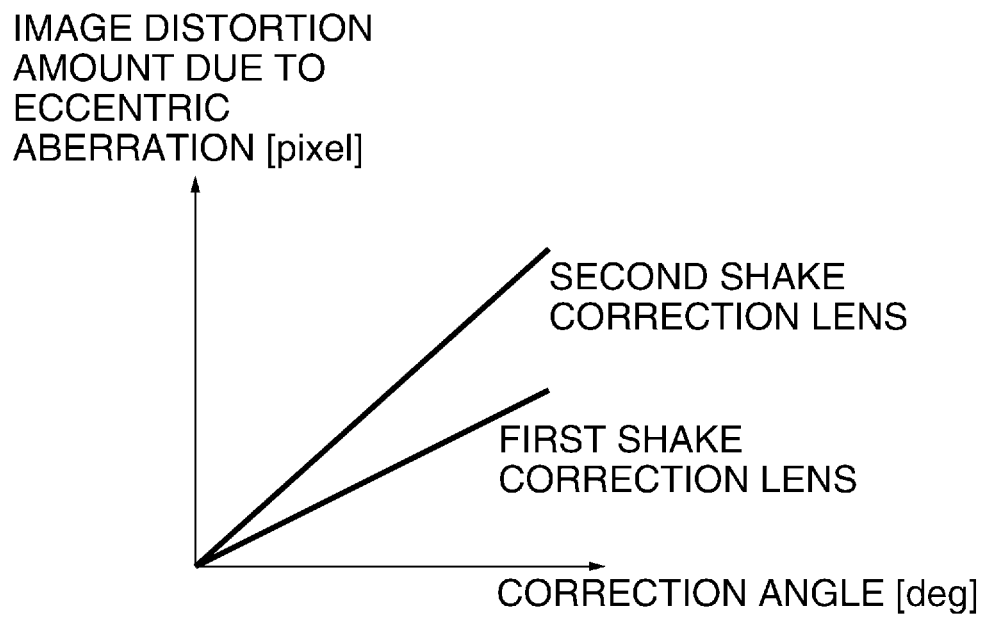
FIG. 2B is a graph showing relations between correction angles and image distortions due to eccentric aberration of the first shake correction lens and the second shake correction lens among characteristics information stored in the optical system database shown in FIG. 1.

FIG. 2A and FIG. 2B are graphs showing the characteristics information that is stored in the optical system database 109 shown in FIG. 1 and that specifies the relations between the correction angles of the first shake correction lens and the second shake correction lens and image qualities. Then, FIG. 2A is a graph showing relations between focal lengths and maximum correction angles, and FIG. 2B is a graph showing relations between correction angles and image distortion amounts due to eccentric aberration.

As shown in FIG. 2A and FIG. 2B, the optical characteristics differ between the first shake correction lens 102 and the second shake correction lens 103. Since the shake correction lens shifts from the optical axis of the optical system 101 when correcting shake of the camera, the resolution deteriorates and the image distorts unescapably due to eccentric aberration.

The relations (first characteristics) between the focal lengths and the maximum correction angles are specified in FIG. 2A. The maximum correction angle expresses the maximum shake angle that can be corrected while maintaining specified resolution. That is, the larger the maximum correction angle is, the higher the stabilization effect (the image blur correction effect) is.

The focal length in which the maximum correction angles of the first shake correction lens 102 and the second shake correction lens 103 are matched is assumed "fa" (referred to as a coincidence focal length, hereafter). In the example shown in FIG. 2A, when the focal length is shorter than the coincidence focal length fa, the stabilization effect of the first correction lens 102 is higher than that of the second correction lens 103 because the maximum correction angle of the first shake correction lens 102 is larger than that of the second shake correction lens 103.

On the other hand, when the focal length is longer than the coincidence focal length fa, the stabilization effect of the second correction lens 103 is higher than that of the first correction lens 102 because the maximum correction angle of the second shake correction lens 103 is larger than that of the first shake correction lens 102.

The relationships (second characteristics) between the correction angles and the image distortion amounts due to eccentric aberration for the first shake correction lens 102 and the second shake correction lens 103 are specified in FIG. 2B. It should be noted that the image quality increases as the image distortion due to eccentric aberration decreases.

In the example shown in FIG. 2B, the increase of the image distortion amount due to eccentric aberration corresponding to the increase of the correction angle of the first shake correction lens 102 is smaller than that of the second shake correction lens 103. That is, in any correction angles, a higher quality image can be obtained by moving the first shake correction lens 102 for the shake correction rather than by moving the second shake correction lens 103 for the shake correction.

The optical system database 109 stores the characteristics about the respective shake correction lenses shown in FIG. 2A and FIG. 2B as the characteristics information. That is, the optical system database 109 beforehand stores the data that associates the focal lengths with the maximum correction angles for the first shake correction lens 102 and the second shake correction lens 103 (FIG. 2A) and the data that associates the correction angles with the image distortion amounts due to eccentric aberration (FIG. 2B).

When the lens characteristics (i.e., the characteristics information) shown in FIG. 2A and FIG. 2B are taken into consideration, since a higher stabilization effect and a higher quality image can be obtained by moving the first shake correction lens 102 rather than by moving the second shake correction lens 103 when the focal length is shorter than the coincidence focal length fa, it is preferable to use the first shake correction lens 102 for the shake correction when the focal length is shorter than the coincidence focal length fa.

When the focal length is longer than the coincidence focal length fa on the other hand, a higher stabilization effect can be obtained by moving the second shake correction lens 103 rather than by moving the first shake correction lens 102, but the quality of an image obtained as a result of shooting is low when the second shake correction lens 103 is moved for the shake correction.

Accordingly, when the focal length is longer than the coincidence focal length fa, and when a priority is given to the stabilization effect, the second shake correction lens 103 is moved for the shake correction.

On the other hand, when a priority is given to the image quality, the first shake correction lens 102 is moved for the shake correction. In the following description, shake correction modes shall include a stabilization effect priority mode that gives a priority to the stabilization effect, an image quality priority mode that gives a priority to the image quality, and the below-mentioned middle mode.

Figure 3A:
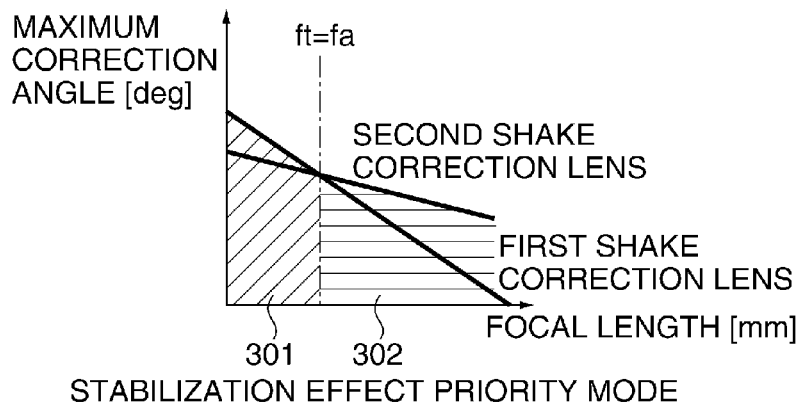
FIG. 3A is a graph showing a control of the camera shown in FIG. 1 in an image blur correction effect priority mode.
Figure 3B:
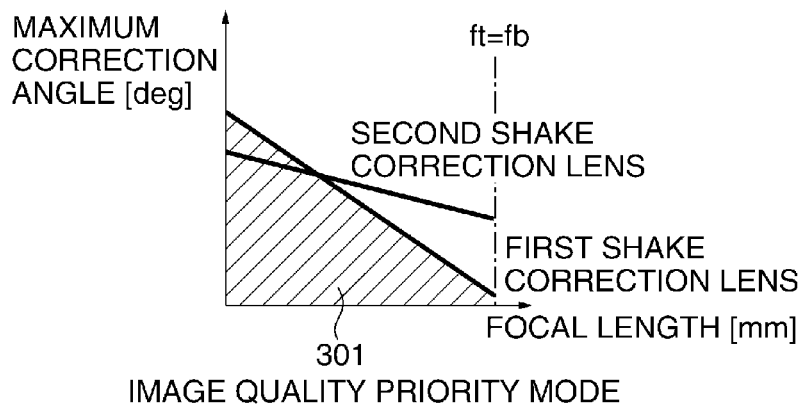
FIG. 3B is a graph showing a control of the camera shown in FIG. 1 in an image quality priority mode.
Figure 3C:
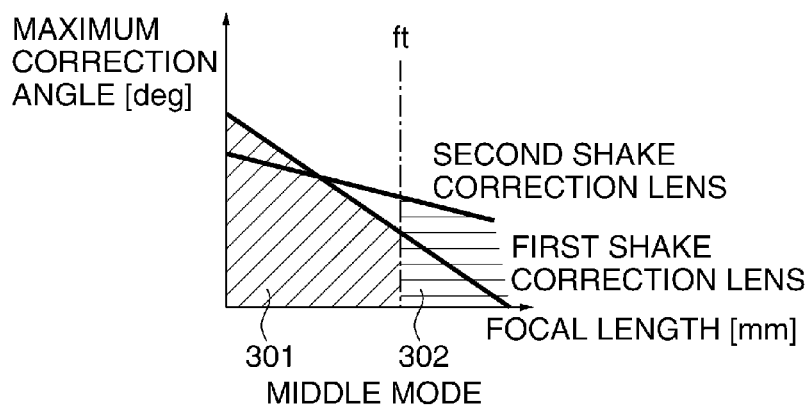
FIG. 3C is a graph showing a control of the camera shown in FIG. 1 in a middle mode.

FIG. 3A, FIG. 3B, and FIG. 3C are graphs showing controls performed in the camera shown in FIG. 1 in the respective shake correction modes. FIG. 3A is a graph showing a control in the stabilization effect priority mode, and FIG. 3B is a graph showing a control in the image quality priority mode. Moreover, FIG. 3C is a graph showing a control in the middle mode.

In FIG. 3A, FIG. 3B, and FIG. 3C, the shake correction lens to be used for shake correction is switched between the first shake correction lens 102 and the second shake correction lens 103 at a focal length ft (referred to as a change focal length, hereafter). When the focal length of the camera (i.e., the optical system 101) is not longer than the change focal length ft, the first shake correction lens 102 is used for the shake correction.

On the other hand, when the focal length of the camera exceeds the change focal length ft, the second shake correction lens 103 is used for the shake correction.

It should be noted that slant hatching areas 301 in FIG. 3A, FIG. 3B, and FIG. 3C represent movable ranges of the first shake correction lens 102 and horizontal hatching areas 302 represent movable ranges of the second shake correction lens 103.

In the stabilization effect priority mode shown in FIG. 3A, the change focal length ft matches the coincidence focal length fa. As a result of this, the shake correction can be performed to the maximum correction angle in any focal length of the camera.

However, since the shake correction is performed using the second shake correction lens 103 when the focal length of the camera is longer than the coincidence focal length fa as mentioned above, the image distortion amount due to eccentric aberration becomes large, which deteriorates the image quality somewhat.

In the stabilization effect priority mode, when the camera shake exceeds the maximum correction angle that can be responded by one shake compensating lens, both the first shake correction lens and the second shake correction lens may be moved to extend the maximum correction angle. However, in this case, the image distortion due to eccentric aberration will be complicated and image quality will deteriorate.

In the image quality priority mode shown in FIG. 3B, the change focal length ft matches the focal length fb at the tele end (i.e., the telephoto end). As a result of this, since the first shake correction lens 102 is used for the shake correction in any focal lengths of the camera, the image distortion amount due to eccentric aberration can be kept small.

However, since the shake correction is performed using the first shake correction lens 102 even when the focal length of the camera is longer than the coincidence focal length fa as mentioned above, the maximum correction angle decreases, which deteriorates the stabilization effect somewhat.

In the middle mode shown in FIG. 3C, the change focal length ft is set in the middle between the coincidence focal length fa and the tele end focal length fb.

FIG. 4 is a flowchart showing a shake correction process executed by the camera shown in FIG. 1. It should be noted that the process of the flowchart shown in FIG. 4 is executed under the control by the system control unit 106.

When the shake correction process is started, the camera information obtaining unit 108 obtains the camera information (the shake information) from the system control unit 106 (step S401).

Next, the shake correction lens determination unit 110 presumes the photographing condition in the camera based on the camera information that was obtained by the camera information obtaining unit 108. Then, the shake correction lens determination unit 110 determines which of the stabilization effect priority mode and the image quality priority mode is suitable according to the photographing condition, and determines the shake correction mode (step S402). Hereinafter, the shake correction mode determined in the step S402 is called a determined shake correction mode.

Next, the shake correction lens determination unit 110 determines whether the determined shake correction mode is the stabilization effect priority mode (step S403).

When the determined shake correction mode is the image quality priority mode (NO in the step S403), the shake correction lens determination unit 110 compares the current focal length f with the change focal length ft in the determined shake correction mode, and determines whether the current focal length f is smaller than the change focal length ft (step S404). When f is smaller than ft (YES in the step S404), the shake correction lens determination unit 110 determines to use the first shake correction lens 102. Then, the shake correction lens determination unit 110 notifies the optical system control unit 111 of the determination.

The optical system control unit 111 performs the shake correction by controlling the driving of the first shake correction lens 102 based on the shake information obtained by the camera information obtaining unit 108, i.e., the shake information detected by the shake detection unit 107 (step S405). Then, the optical system control unit 111 finishes the shake correction process.

When the determined shake correction mode is the stabilization effect priority mode on the other hand (YES in the step S403), the shake correction lens determination unit 110 compare the current focal length f with the change focal length ft, and determines whether the current focal length f is smaller than the change focal length ft (step S407).

When the current focal length f is smaller than the change focal length ft (YES in the step S407), the shake correction lens determination unit 110 compares the current shake amount T with the maximum correction angle T1 of the first shake correction lens, and determines whether the current shake amount T is smaller than the maximum correction angle T1 (step S408).

When the current shake amount T is smaller than the maximum correction angle T1 (YES in the step S408), the shake correction lens determination unit 110 determines to use the first shake correction lens 102. Then, the shake correction lens determination unit 110 notifies the optical system control unit 111 of the determination.

The optical system control unit 111 performs the shake correction by controlling the driving of the first shake correction lens 102 based on the shake information obtained by the camera information obtaining unit 108, i.e., the shake information detected by the shake detection unit 107 (step S409). Then, the optical system control unit 111 finishes the shake correction process.

On the other hand, when the current shake amount T is larger than the maximum correction angle T1 (NO in the step S408), the shake correction lens determination unit 110 determines to use the first shake correction lens 102 and the second shake correction lens 103. Then, the shake correction lens determination unit 110 notifies the optical system control unit 111 of the determination.

The optical system control unit 111 performs the shake correction by controlling so that the correction angle by the first shake correction lens 102 is T1 and the correction angle by the second shake correction lens 103 is (T−T1) based on the shake information obtained by the camera information obtaining unit 108 (step S410). It should be noted that it is controlled so that (T−T1) is not larger than the maximum correction angle T2 of the second shake correction lens. Then, the optical system control unit 111 finishes the shake correction process.

On the other hand, when the current focal length f is larger than the change focal length ft (NO in the step S407), the shake correction lens determination unit 110 compares the current shake amount T with the maximum correction angle T2 of the second shake correction lens based on the shake information obtained by the camera information obtaining unit 108, and determines whether the current shake amount T is smaller than the maximum correction angle T2 (step S411).

When the current shake amount T is smaller than the maximum correction angle T2 (YES in the step S411), the shake correction lens determination unit 110 determines to use the second shake correction lens 103. Then, the shake correction lens determination unit 110 notifies the optical system control unit 111 of the determination.

The optical system control unit 111 performs the shake correction by controlling the driving of the second shake correction lens 103 based on the shake information obtained by the camera information obtaining unit 108, i.e., the shake information detected by the shake detection unit 107 (step S412). Then, the optical system control unit 111 finishes the shake correction process.

On the other hand, when the current shake amount T is larger than the maximum correction angle T2 (NO in the step S411), the shake correction lens determination unit 110 determines to use the first shake correction lens 102 and the second shake correction lens 103. Then, the shake correction lens determination unit 110 notifies the optical system control unit 111 of the determination.

The optical system control unit 111 performs the shake correction by controlling so that the correction angle by the first shake correction lens 102 is (T−T2) and the correction angle by the second shake correction lens 103 is T2 based on the shake information obtained by the camera information obtaining unit 108 (step S413). It should be noted that it is controlled so that (T−T2) is smaller than the maximum correction angle T1 of the first shake correction lens. Then, the optical system control unit 111 finishes the shake correction process.

The details of the shake correction mode determination process in the step S402 in FIG. 4 will be described.

The shake correction lens determination unit 110 estimates the shooting method in the camera based on the shake information among the camera information, and determines the priority of the stabilization effect and the image quality according to this estimated result.

Figure 5:
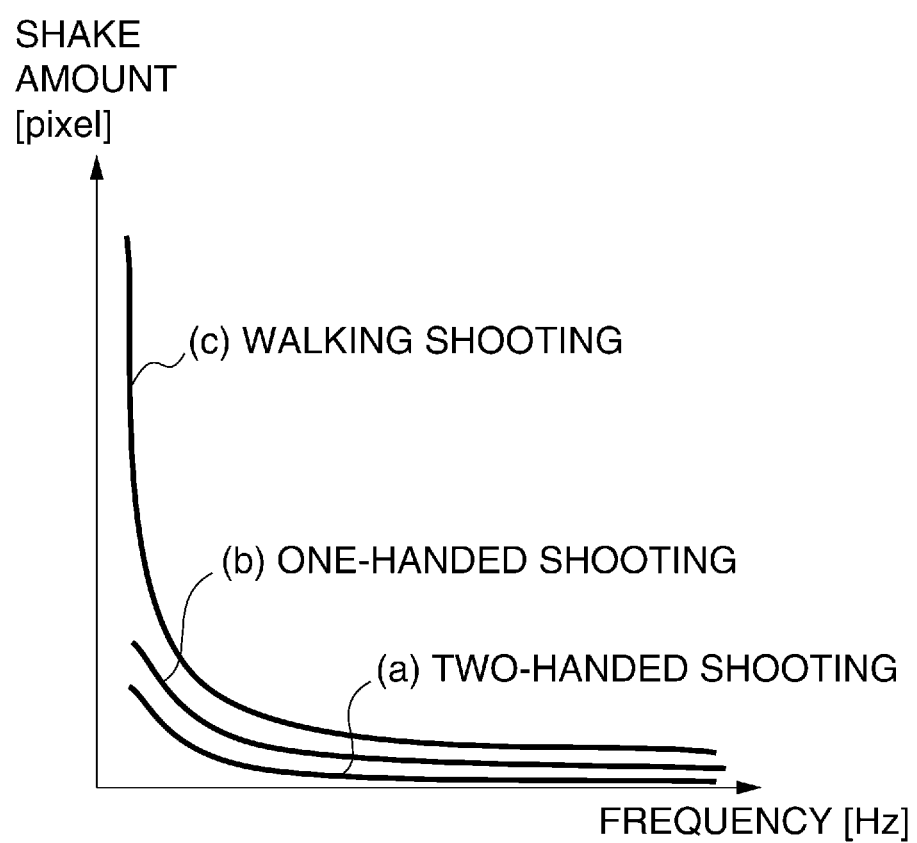
FIG. 5 is a graph showing relations between shake amounts and shake frequencies in various shooting methods in the camera shown in FIG. 1.

FIG. 5 is a graph showing relations between shake amounts and shake frequencies in various shooting methods in the camera shown in FIG. 1.

As shown in FIG. 5, a photographer takes a picture with the camera by walking shooting, by one-handed shooting, or by a two-handed shooting, for example. Then, the relations between shake amounts and shake frequencies are different among the waking shooting, the one-handed shooting, and the two-handed shooting.

In the walking shooting, the shake amount becomes extremely large in a low frequency range as shown by a curve (c), and the shake amount is larger than that in the one-handed shooting and the two-handed shooting over the entire frequency range (from the low frequency range to the high frequency range).

In the two-handed shooting on the other hand, the shake amount is small over the entire frequency range (from the low frequency range to the high frequency range) as shown by a curve (a). Moreover, the shake amount in the one-handed shooting (a curve (b)) takes a middle position between the shake amount in the walking shooting (the curve (c)) and the shake amount in the two-handed shooting (the curve (a)) over the entire frequency range (from the low frequency range to the high frequency range).

As understood easily from FIG. 5, the shake correction lens determination unit 110 obtains the shake amount by detecting one low frequency band (2 Hz through 3 Hz, for example) in the curve that represents the relation between the shake amount and the frequency in order to determine which of the walking shooting, the one-handed shooting, and the two-handed shooting matches the current shooting method. When the shake amount is large, the shake correction lens determination unit 110 determines that the current shooting method is the walking shooting.

Moreover, when the shake amount is medium, the shake correction lens determination unit 110 determines that the current shooting method is the one-handed shooting. When the shake amount is small, the shake correction lens determination unit 110 determines that the current shooting method is the two-handed shooting.

A first shake threshold and a second shake threshold are set to the shake correction lens determination unit 110 (the first shake-threshold is larger than the second shake threshold). Then, when the shake amount is not smaller than the first shake threshold, the shake correction lens determination unit 110 determines that the current shooting method is the walking shooting.

Moreover, when the shake amount is smaller than the first shake threshold and is not smaller than the second shake threshold, the shake correction lens determination unit 110 determines that the current shooting method is the one-handed shooting. Furthermore, when the shake amount is smaller than the second shake threshold, the shake correction lens determination unit 110 determines that the current shooting method is the two-handed shooting.

When the shooting method is the walking shooting, the shake correction lens determination unit 110 gives priority to the stabilization effect rather than the image quality, because it is anticipated that a large shake will occur with high frequency. On the other hand, when the shooting method is the two-handed shooting, the shake correction lens determination unit 110 gives priority to the image quality rather than the stabilization effect, because it is anticipated that a large shake will occur with low frequency, FIG. 6 is a view showing examples of relationships between shake correction modes and camera information in the camera shown in FIG. 1.

In the step S401 in FIG. 4, at least one of main subject information, shutter speed, and a shooting mode may be obtained other than the shake information detected by the shake detection unit 107.

The main subject information expresses a person likeness, distance from a camera to a main subject, a size of a main subject, and a motion of a main subject, for example. When a main subject is a person's face, the system control unit 106 obtains the information that shows the color and outline of the main subject according to the image data obtained from the image signal processing unit 105 using a known method. Then, the system control unit 106 determines the person likeness and the size of the main subject using the information concerning the color and outline of the main subjects.

Moreover, although not shown in FIG. 1, the system control unit 106 finds the distance from the camera to the main subject according to the position of the focus lens detected by an automatic focus detection process, for example. Furthermore, the system control unit 106 detects a motion vector between image frames with a known method and finds a motion of a main subject according to the motion vector concerned.

As mentioned above, the main subject information includes the information that expresses a person likeness, distance from a camera to a main subject, a size of a main subject, and a motion of a main subject. Since human being has very high cognition to a person's face, human being feels uncomfortable when a person's face is distorted slightly. Accordingly, a distortion is conspicuous for a user when a subject has a high person likeness.

On the other hand, in a subject like landscape other than a person, a motion of the entire image due to camera shake is conspicuous rather than distortion. Accordingly, with respect to the person likeness of a subject, it is preferable to give a priority to image quality rather than stabilization effect as the person likeness increases.

Moreover, distortion in a main subject area is conspicuous rather than a motion of the entire image due to camera shake as the distance to the main subject becomes shorter. Accordingly, with respect to the distance to the main subject, it is preferable to give a priority to image quality rather than stabilization effect as the distance to the main subject shortens.

Moreover, distortion in a main subject area is conspicuous rather than a motion of the entire image due to camera shake as the size of the main subject becomes larger. Accordingly, with respect to the size of the main subject, it is preferable to give a priority to image quality rather than stabilization effect as the size of the main subject enlarges.

Moreover, distortion in a main subject area is conspicuous rather than a motion of the entire image due to camera shake as the motion of the main subject becomes small. Accordingly, with respect to the motion of the main subject, it is preferable to give a priority to image quality rather than stabilization effect as the motion of the main subject becomes small.

With respect to a shutter speed, when the shutter speed is slow, an effect of accumulated blur in the image pickup device 104 becomes large. Accordingly, a motion of the entire image due to camera shake becomes conspicuous rather than distortion of a partial image.

On the other hand, when shutter speed is fast, the effect of the accumulated blur in the image pickup device 104 becomes small. Accordingly, distortion of an image becomes conspicuous rather than a motion of the entire image. Accordingly, it is preferable to give a priority to image quality rather than stabilization effect as the shutter speed is faster.

With respect to the shooting mode, there is high possibility of shooting a person in a portrait mode, and there is high possibility of shooting landscape in a landscape mode, for example. Accordingly, as mentioned for the person likeness of the main subject, it is preferable to give a priority to image quality rather than stabilization effect in the portrait mode, and it is preferable to give a priority to stabilization effect rather than image quality in the landscape mode.

Moreover, when a camera is attached to a tripod, it is preferable to give a priority to image quality rather than stabilization effect, because the camera shake becomes extremely small as compared with a hand-holding shooting.

With respect to the shooting mode, the system determines which of the stabilization effect and the image quality should have a priority while anticipating a photographing condition according to the shoot mode. It should be noted that the system determines that it is impossible to a shooting mode in which various photographing conditions are assumed.

Incidentally, as shown in FIG. 6, when camera information has a plurality of items (i.e., a plurality of kinds of information), the determination results about which of the stabilization effect and the image quality should have a priority may differ for the respective items. In such a case, the system control unit 106 should determine which of the stabilization effect and the image quality has a priority according to a majority decision by weighting the determination results corresponding to the items.

In this case, if the shake correction mode is changed frequently, the continuity of images may be spoiled, as a result of switching the shake correction lenses even if an image is captured in the same focal length.

Accordingly, when a shake correction mode that is suitable for the photographing condition is determined for every frame, the system control unit 106 changes a shake correction mode only when the same determination results are obtained continuously for a predetermined number of frames with reference to the shake correction mode about the past frames, for example.

In this way, since the embodiment of the present invention controls a plurality of shake correction lenses selectively according to the photographing condition, the stabilization effect and the image quality can be consistent. As a result, the eccentric aberration can be reduced, and the image blur can be reduced.

Although the embodiments of the invention have been described, the present invention is not limited to the above-mentioned embodiments, the present invention includes various modifications as long as the concept of the invention is not deviated.

For example, the functions of the above mentioned embodiments may be achieved as a control method that is executed by an image pickup apparatus. Moreover, the functions of the above mentioned embodiments may be achieved as a control program that is executed by a computer with which the image pickup apparatus is provided. It should be noted that the control program is recorded into a computer-readable storage medium, for example.

The optical device of the present invention includes an interchangeable lens alone, a camera alone, and the image pickup apparatus that is provided with the optical system 101 and the image pickup device 104. The image pickup apparatus in the FIG. 1 of the present invention has the optical system 101 and the image pickup device 104.

Although the interchangeable lens includes the optical system 101, it does not include the image pickup device 104. Although the camera does not include the optical system 101, it includes the image pickup device 104.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-111953, filed May 28, 2013, and No. 2014-056232, filed Mar. 19, 2014, which are hereby incorporated by reference herein in their entireties.

What is claimed is:

1. An optical device comprising:
   a first shake correction unit, having a first correcting lens, configured to correct image blur by relatively moving said first correcting lens based on shake information that is detected by a shake detection sensor; and
   a second shake correction unit, having a second correcting lens, configured to correct image blur by relatively moving said second correcting lens based on shake information that is detected by a shake detection sensor,
   wherein said second shake correction unit has a different image blur correction effect from said first shake correction unit, and
   wherein the optical device has a mode in which shake correction is performed using said first shake correction unit without using said second shake correction unit.

2. The optical device according to claim 1, wherein image distortion amount with respect to a correction angle of said first shake correction unit is smaller than that of said second shake correction unit.

3. The optical device according to claim 2, wherein the image blur correction effect of said first shake correction unit is lower than that of said second shake correction unit.

4. The optical device according to claim 2, wherein an image quality priority mode is selected and image blur is optically corrected using said first shake correction unit when the optical device is attached to a tripod.

5. The optical device according to claim 1, wherein image blur correction effect of said second shake correction unit is higher than that of said first shake correction unit, and wherein the optical device has a mode in which shake correction is performed using said second shake correction unit without using said first shake correction unit.

6. The optical device according to claim 5, wherein image distortion amount with respect to a correction angle of said second shake correction unit is larger than that of said first shake correction unit.

7. The optical device according to claim 1, wherein the image blur is optically corrected using said first and second shake correction units when a shake amount related to the shake information is not smaller than a first threshold, and
   wherein the image blur is optically corrected using said first shake correction unit when the shake amount is smaller than the first threshold.

8. The optical device according to claim 1, wherein the optical device has a mode in which said first correcting lens is not moved when said second correcting lens is moved, and
   wherein the image blur correction effect of said second shake correction unit is higher than that of said first shake correction unit, and image distortion amount with respect to a correction angle of said first shake correction unit is smaller than that of said second shake correction unit.

9. The optical device according to claim 8, wherein maximum correction angles, which show the image blur correction effects of said first and second shake correction units, vary with focal length.

10. The optical device according to claim 8, wherein image blur is optically corrected using said second shake correction unit when a shake amount related to the shake information is not smaller than a first threshold, and wherein image blur is optically corrected using said first shake correction unit when the shake amount is smaller than the first threshold.

11. A control method for an optical device comprising:
    correcting image blur optically by controlling a first shake correction unit, having a first correcting lens, based on shake information detected by a shake detection sensor; and
    correcting image blur optically by controlling a second shake correction unit, having a second correcting lens, of which an image blur correction effect is different from that of the first shake correction unit based on shake information detected by said shake detection sensor, wherein the control method has a mode in which shake correction is performed using said first shake correction unit without using said second shake correction unit.

12. A non-transitory computer-readable storage medium storing a control program causing a computer to execute a control method for an optical device, the control method comprising:

correcting image blur optically by controlling a first shake correction unit, having a first correcting lens, based on shake information detected by a shake detection sensor; and correcting image blur optically by controlling a second shake correction unit, having a second correcting lens, of which an image blur correction effect is different from that of the first shake correction unit based on shake information detected by said shake detection sensor, wherein the control method has a mode in which shake correction is performed using said first shake correction unit without using said second shake correction unit.

* * * * *